July 6, 1937.　　　　　A. ROSS　　　　　2,085,869
COUPLING FOR BRAKE SYSTEMS
Filed Oct. 1, 1935
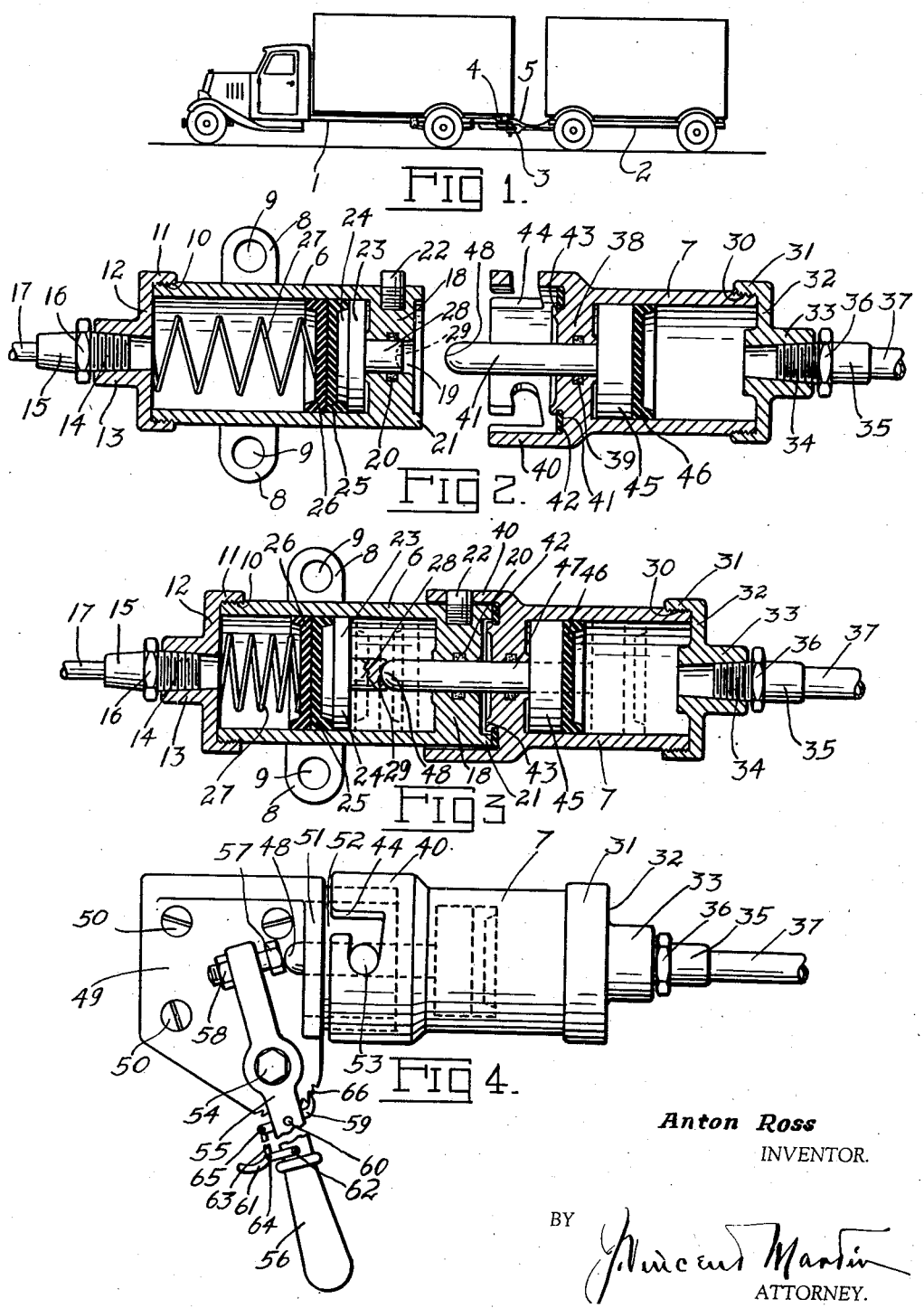
Anton Ross
INVENTOR.
BY
ATTORNEY.

Patented July 6, 1937

2,085,869

UNITED STATES PATENT OFFICE 2,085,869

COUPLING FOR BRAKE SYSTEMS

Anton Ross, Houston, Tex.

Application October 1, 1935, Serial No. 43,031

3 Claims. (Cl. 188—3)

This invention relates generally to braking systems, and has particular reference to a means for detachably coupling together the braking systems of a towing vehicle and a trailer or towed vehicle, where such systems are of the type employing variations in fluid pressure for actuating the brakes.

There are in general three types of braking systems in which the braking force is transmitted by variations in fluid pressure. These constitute those systems in which the brakes are actuated by suction or by decreasing the fluid pressure in a closed system, those in which the brakes are actuated by air pressure in which the force is transmitted by increasing the pressure of air or other gaseous medium in a closed system, and those in which the braking force is transmitted by increasing the pressure on a substantially incompressible liquid which completely fills a closed system. In the past it has been customary in coupling a trailer to a towing vehicle, to couple the braking system of the trailer to that of the towing vehicle simply by connecting the two systems with a flexible conduit or hose. However, in order to provide for the operation of the towing vehicle when the trailer is disconnected therefrom, it has been necessary to provide a valve or similar device to close the opening to which the hose of the trailer is connected. Necessarily, such a valve is spaced a slight distance from the end of the pipe in which it is located, and it is impossible to place a hose on this connection and open the braking system of the towing vehicle to that of the towed vehicle without introducing into the system some air from the outside. While this is not detrimental in some forms of fluid actuated braking systems, it is highly detrimental to the form in which an incompressible liquid is employed, because of the fact that it introduces into the system a highly compressible and elastic medium, and thus renders uncertain the operation of the brakes. In addition to the above, it is necessary in order to provide a tight joint, to provide clamps or the like by which the flexible conduit may be tightly clamped at its opposite ends. It is necessary in coupling or uncoupling to employ considerable time in tightening or loosening these joints, and it is never absolutely certain that some operator will not in the hurry of coupling fail to get the joint tight. It is also pointed out that where any break or defect occurs in the braking system of the trailer where such a connection is used, it will affect not only the brakes of the trailer, but also the brakes of the towing vehicle, and may render them all wholly inoperative.

It is an object of this invention to provide a means for coupling together the braking systems of two vehicles employing fluid actuated brakes, in which the various undesirable features above discussed will be eliminated.

Specifically, it is an object to provide a device which will make it possible to couple and uncouple the braking system of a trailer from that of a towing vehicle without opening either system to the atmosphere, to provide a means whereby the two systems may be coupled and uncoupled in the simplest possible manner without the use of valves or the like, and without the use of parts which are not permanently attached to either one vehicle or the other. Further, it is an object to provide a device which will be unfailing in operation, which will employ a minimum of moving parts, and which will obviate the necessity of making or breaking fluid tight joints during the process of coupling and uncoupling. Another object is to provide a means for the support of those parts of the coupling device which are permanently attached to the trailer at such times as the trailer is disconnected from the main vehicle, and also to provide for the application of the brakes of the trailer when it is free from the main vehicle.

With the above and other objects in view, this invention comprises the various parts and combinations thereof as set forth by way of example and illustration in the accompanying drawing and the following description. It is to be understood, however, that the same is by way of illustration only, and is not to be taken as in any way limiting the scope of this invention. Such limitation is to be only by the prior art and by the terms of the appended claims.

Referring now more particularly to the drawing, in which like numerals indicate corresponding parts throughout:

Fig. 1 is an elevation of a towing vehicle and trailer coupled together, and illustrating one application of this invention.

Fig. 2 is a longitudinal sectional view of a coupler constructed in accordance with this invention, the parts being shown in position as they are about to be joined together in coupling the vehicles.

Fig. 3 is a view similar to Fig. 2 showing the parts after they have been joined together.

Fig. 4 is a view showing the use of a device on the towed vehicle whereby that part of the coupling on said vehicle may be supported, and the brakes thereof applied while the vehicle is disconnected from the main vehicle.

In Fig. 1 there is shown a truck 1 and a trailer 2, both of conventional construction and coupled together by means of any preferred mechanical coupling device such as illustrated at 3. The brake coupler, in accordance with this invention, may be located at 4 and the connection from this coupling device, which is on the truck 1, to the trailer is effected by means of a flexible conduit 5.

In the embodiment selected for the purpose of illustration, this coupling device comprises two cylinders, a primary cylinder 6 which is permanently and fixedly secured to the towing vehicle, and a secondary power cylinder 7 which is permanently attached to the trailer, but which is not rigidly secured thereto. For the purpose of securing the cylinder 6 to the towing vehicle, there are provided ears 8 having perforations 9 therein through which conventional securing means may be passed in a well known manner. These ears are integrally joined to the cylinder 6.

The cylinder 6 is formed adjacent one of its ends with an externally threaded zone 10 adapted to receive the internally threaded flange 11 of a cylinder head 12. The cylinder head 12 is in turn provided with a hollow boss 13 internally threaded to receive the threaded end 14 of a pipe joint 15. This pipe joint is provided with a hexagonal portion 16, and is adapted to form a fluid tight joint between the pipe 17 and the interior of the cylinder 6. Pipe 17 is connected to and communicates at all times with the braking system of the towing vehicle.

At the opposite end of the cylinder 6 there is provided a closure wall 18 having an opening 19 therethrough, a dust guard 20 being provided within the opening for a purpose which will presently appear. The wall of the cylinder extends slightly beyond the closure wall 18 as illustrated at 21. This extension 21, together with pins 22 which extend radially from the cylinder wall, form the means of coupling to this cylinder that portion of the coupling which is on the trailer.

Within the cylinder 6 there is disposed a piston 23 having a tapered projecting part 24 on one face thereof. Overlying this tapered part and having its flanges surrounding the same is a cup-shaped packing 25 which is designed to prevent air from entering the cylinder past the piston 23 when the pressure within the cylinder is lowered. Seated against the packing 25 is a second packing 26 of like formation, but having its flange disposed in a direction opposite to that of the packing 25. A compression spring 27 is disposed between the packing 26 and the cylinder head 12 for the purpose of constantly urging the piston 23 and the packings 25 and 26 toward the closure wall 18. On the opposite face of the piston 23 there is formed a stub piston rod 28 having a concavity 29 formed in the end thereof. This rod 28 is of a diameter substantially equal to the diameter of the opening 19 which it is adapted to enter.

The secondary cylinder 7 is likewise provided with threads 30 adjacent one of its ends for the purpose of receiving the threaded flange 31 of the cylinder head 32. This cylinder head is also provided with an internally threaded hollow boss 33 adapted to receive the threaded end 34 of the pipe joint 35. This pipe joint has a hexagonal portion 36 for the reception of a wrench or the like, and is for the purpose of connecting the flexible conduit 37 to the cylinder 7. The flexible conduit 37 is permanently connected to the braking system of the trailer or towed vehicle, and serves to permanently attach the cylinder 7 thereto.

At its end opposite the cylinder head the cylinder 7 is formed with a closure wall 38 having an opening therethrough provided with a dust guard 39. A portion of the wall of the cylinder 7 extends past the closure wall 38 and is outwardly off-set as at 40, a seat 41 receiving a packing ring 42 being thus formed against the closure wall. The packing ring 42 is retained in place by means of the lower flange 43 of the closure wall. The packing 42 is adapted to receive the extension 21 of the wall of the cylinder 6, and the radially extending pins 22 are adapted to enter the bayonet slots 44 provided in the part 40. It will be seen that this makes it possible to easily and quickly join the two cylinders together in a substantially rigid manner.

Positioned within the secondary cylinder 7 is a secondary piston 45 against which is seated a cup-shaped packing 46. On the opposite face of this piston there is formed a second stub piston rod 47 having a rounded or convex end 48.

The stub piston rods 28 and 47 are of such a size that they will pass through the openings in the walls 18 and 38 and permit air to pass through said openings into and out of the cylinders as the pistons move back and forth. The dust guards 20 and 39 are likewise formed to permit such passage of air but to prevent dust from entering the cylinders with the air.

For the purpose of supporting the cylinder 7 and the parts carried thereby when the trailer is disconnected from the towing vehicle, there is mounted on the trailer a bracket 49 by means such as the screws 50. This bracket includes an outstanding flange 51 upon which is formed a cylindrical flange 52 carrying radially extending pins 53. The flange 52 is of the same external diameter as the cylinder 6, and pins 53 are similar and similarly positioned to the pins 22. The bracket 49 is thus adapted to receive the cylinder 7 in the same manner as is the cylinder 6.

Mounted on the bracket 49 by means of a pivot 54 is a lever 55 having on one end thereof a handle 56 and in the other end thereof a bolt 57 locked in place by a nut 58. This bolt 57 is so positioned as to contact the rounded end 48 of the rod 47 when the cylinder 7 is secured to the bracket. It will thus be seen that movement of the handle in a clock-wise direction, as viewed in Fig. 4, will effect movement of the piston 45 and the application of the brakes of the trailer. In order to hold this lever in position to apply the brakes, it is provided with a pawl 59 pivotally mounted at 60. This pawl is actuated by a trigger 61 pivoted to the lever at 62, and joined to the pawl by means of a link 63. This link is connected to the trigger 61 at the point 64, and to the pawl 59 at the point 65. The pawl 59 cooperates with ratchet teeth 66 formed along the edge of the bracket 49.

In operation, the cylinder 6 is always in communication with the braking system of the towing vehicle. When the trailer is not coupled thereto, the spring 27 serves to maintain the piston 23 and the packings 25 and 26 in the position shown in Fig. 2, so that when pressure is introduced into the system to apply the brakes, there will be no movement of these parts to render the application of the brakes uncertain.

In coupling the vehicles together the end of the rod 47 is placed within the opening 19 against the end of the rod 28. The rounded end of the rod 47 will seat itself in the concave end of the rod 28 and form a self-centering connection. As the cylinder 7 is moved toward cylinder 6, the spring 27 is compressed and the piston and packings 23, 25 and 26 are moved away from the closure wall 18. The pins 22 are engaged in the slots 44 and a slight twist of the cylinder 7 will firmly secure it in place on the cylinder 6 where it will be held in operative position. When these two are coupled together as described, an increase in pressure in the braking system of the towing vehicle will cause the piston 23 to move to the right and will cause the consequent movement of the piston 45 within the cylinder 7. The cylinder 45 by such movement compresses the fluid within the braking system of the towed vehicle and causes the application of the brakes thereof. While there is no fluid connection between the two systems, there is a direct and positive acting connection between the two, and the application of the brakes of the two vehicles will be found to be substantially simultaneous.

When the cylinder 7 is disconnected from the cylinder 6, it is connected to the bracket 49 in a manner readily apparent. When so connected, the brakes of the trailer may easily be set by means of the lever 55, and the trailer thus prevented from rolling and causing possible damage. At the same time the cylinder 7 and its parts are supported and prevented from getting down in the dirt or becoming damaged.

It will be apparent from the foregoing that there has been provided a means for carrying out the objects of this invention in a thoroughly practicable, as well as simple, manner.

While the invention is primarily for the purpose of coupling a towing vehicle and a trailing vehicle, it will be appreciated that its use is not limited to this situation, but that it may be used for coupling any two fluid braking systems for simultaneous operation. It is also noted that while the specific embodiment disclosed is for use in connection with two systems in which an incompressible liquid is employed, it could readily be adapted for use in other systems.

Having described my invention, I claim:

1. The combination with a device carried by a towed vehicle; for operatively connecting a fluid actuated braking system of the towed vehicle to the fluid actuated braking system of a towing vehicle, said device including a secondary power cylinder, and a piston in said cylinder adapted to be actuated to apply the brakes of the towed vehicle, of a means for applying the brakes of the towed vehicle when the same is disconnected from the towing vehicle, said means comprising a bracket on the towed vehicle adapted to receive and rigidly hold said secondary cylinder when it is disconnected from the towing vehicle, a manually operated lever pivotally mounted on said bracket and adapted to actuate the piston in said secondary cylinder to actuate the brakes of the towed vehicle, and a detent device on said lever and bracket for maintaining said lever in brake-applying position.

2. The combination with a device carried by a towed vehicle for operatively connecting the braking system of the towed vehicle to the braking system of a towing vehicle where said device includes a part adapted to be moved to apply the brakes of the towed vehicle, of a means for applying the brakes of the towed vehicle when the same is disconnected from the towing vehicle, said means comprising a bracket on the towed vehicle adapted to receive and rigidly hold the part adapted to apply the brakes of the towed vehicle, a manually operated lever mounted on said bracket and adapted to actuate said part to apply the brakes of the towed vehicle, and a detent device on said lever and bracket for maintaining said lever in brake-applying position.

3. In a device for detachably coupling a fluid braking system of one vehicle to a fluid braking system of a second vehicle, a primary cylinder in communication with the braking system of said one vehicle, a primary piston in said cylinder adapted to be actuated by variation of the pressure in said cylinder as the braking system of said one vehicle is operated, a secondary cylinder in communication with the fluid braking system of the second vehicle, a secondary piston in said secondary cylinder adapted upon movement thereof to cause operation of the braking system of the second vehicle, one of said pistons having a part adapted to bear against a part of and transmit force and movement to the other when the cylinders are held together in operative relation to each other, means for detachably securing said cylinders together in such operative relation, spring means cooperating with said first mentioned piston to constantly urge it toward said second mentioned piston, and packing means on said first mentioned piston adapted to resist passage of fluid between said piston and the cylinder walls in both directions.

ANTON ROSS.